US008600385B2

(12) United States Patent
Yasuoka

(10) Patent No.: US 8,600,385 B2
(45) Date of Patent: Dec. 3, 2013

(54) INTERFACE ESTABLISHING METHOD IN RADIO COMMUNICATION SYSTEM, MANAGEMENT APPARATUS AND RADIO NODE APPARATUS IN RADIO COMMUNICATION SYSTEM

(75) Inventor: Hirotomo Yasuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 12/693,442

(22) Filed: Jan. 26, 2010

(65) Prior Publication Data

US 2010/0248723 A1 Sep. 30, 2010

(30) Foreign Application Priority Data

Mar. 30, 2009 (JP) .................. 2009-080905

(51) Int. Cl.
*H04W 36/00* (2009.01)
*H04W 4/00* (2009.01)
(52) U.S. Cl.
USPC ............................ 455/436; 455/439; 370/331
(58) Field of Classification Search
USPC .................. 455/415, 436, 439; 370/328, 331
See application file for complete search history.

(56) References Cited

U.S. PATENT DOCUMENTS

| 8,089,932 | B2 | 1/2012 | Take |
| 8,169,927 | B2 | 5/2012 | Matsunaga |
| 2002/0119779 | A1* | 8/2002 | Ishikawa et al. ............. 455/437 |
| 2004/0121770 | A1* | 6/2004 | Tigerstedt et al. ............. 455/436 |
| 2008/0064403 | A1* | 3/2008 | Take ............................. 455/436 |
| 2008/0176566 | A1 | 7/2008 | Akita |
| 2008/0311909 | A1* | 12/2008 | Taaghol et al. .............. 455/436 |
| 2010/0008293 | A1* | 1/2010 | Gupta et al. .................. 370/328 |
| 2010/0267373 | A1* | 10/2010 | Engstrom ..................... 455/415 |
| 2012/0177007 | A1 | 7/2012 | Kagimoto et al. |

FOREIGN PATENT DOCUMENTS

| EP | 2134104 A1 | 12/2009 |
| JP | 2008-103865 | 5/2008 |
| JP | 2008-227772 A | 9/2008 |
| JP | 2010-074553 | 4/2010 |
| WO | WO-2006/027849 A1 | 3/2006 |
| WO | WO-2007/142076 A1 | 12/2007 |

OTHER PUBLICATIONS

Japanese Office Action mailed by JPO and corresponding to Japanese application No. 2009-080905 on Nov. 27, 2012, with partial English translation.

* cited by examiner

*Primary Examiner* — Opiribo Georgewill
(74) *Attorney, Agent, or Firm* — Fujitsu Patent Center

(57) ABSTRACT

An interface establishing method in a handover procedure, includes: managing an occurrence status of handover for a plurality of radio node apparatuses; transmitting an establishment instruction from the management apparatus to a first radio node apparatus to establish a first link between the first radio node apparatus and a second radio node apparatus according to the occurrence status of handover, the first radio node apparatus and the second radio node apparatus being accommodated in the management apparatus; and establishing the first link between the first radio node apparatus and the second radio node apparatus based on the establishment instruction.

5 Claims, 28 Drawing Sheets

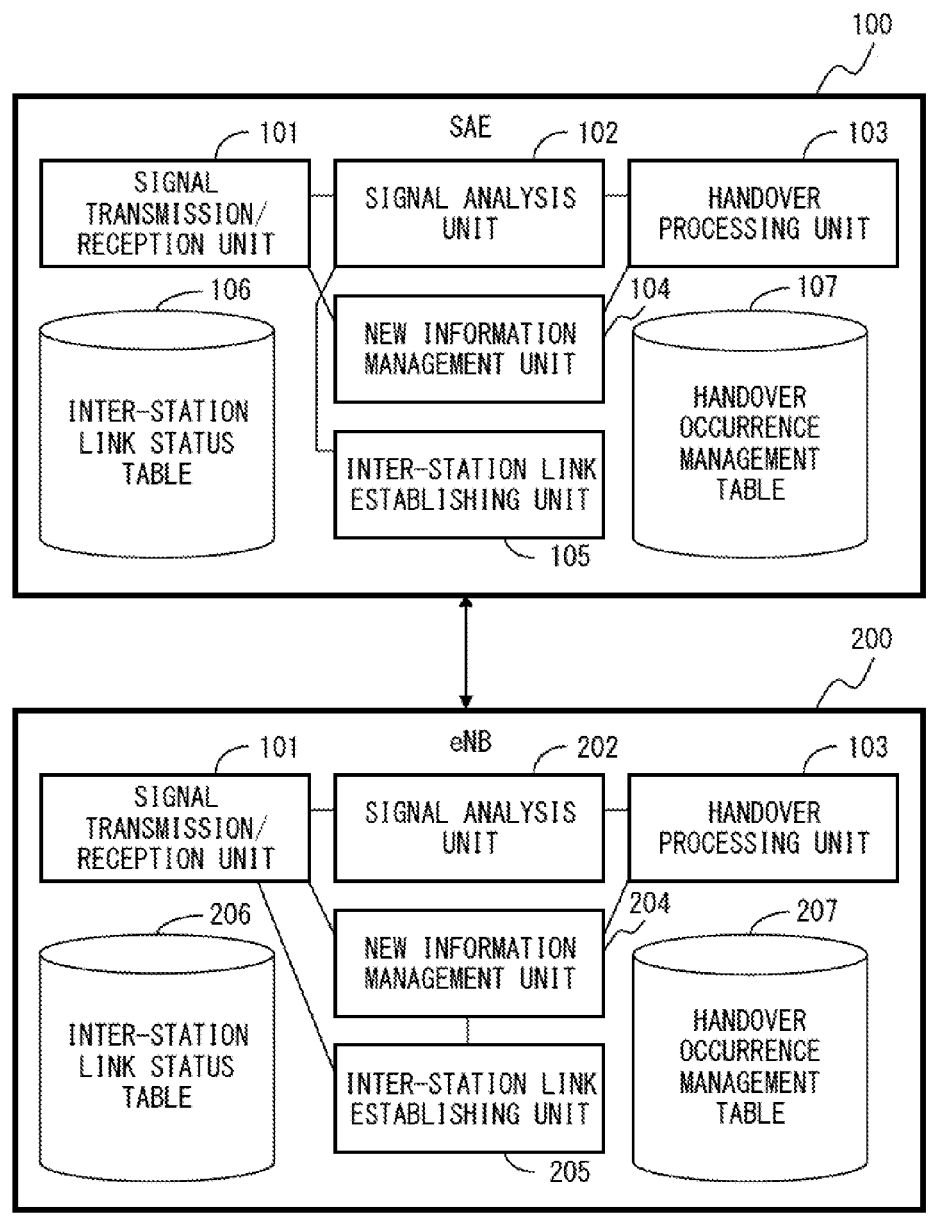
F I G. 1

| eNB ID | eNB 1 | eNB 2 | eNB n |
|---|---|---|---|
| IP ADDRES | a.a.a.a | N/A | c.c.c.c |
| PORT NUMBER | AAAA | N/A | CCCC |
| X2 IF | NOT ESTABLISHED | NOT ESTABLISHED | ESTABLISHED |

X2 IF : ESTABLISHED or NOT ESTABLISHED

F I G. 5

| eNB ID | eNB 0 | eNB 1 | eNB 2 | eNB n |
|---|---|---|---|---|
| IP ADDRES | d.d.d.d | a.a.a.a | b.b.b.b | c.c.c.c |
| PORT NUMBER | DDDD | AAAA | BBBB | CCCC |
| S1-AP IF | ESTABLISHED | ESTABLISHED | ESTABLISHED | ESTABLISHED |

S1-AP IF : ESTABLISHED or NOT ESTABLISHED

F I G. 6

| eNB ID | eNB 0 | eNB 1 | eNB 2 | eNB n |
|---|---|---|---|---|
| S1-AP IF | 10 | 10 | 0 | 0 |

FIG. 7

| eNB ID | eNB 1 | eNB 2 | eNB n |
|--------|-------|-------|-------|
| X2 IF  | 0     | 0     | 10    |

FIG. 8

| IE/Group Name | USAGE |
|---|---|
| Message Type | MESSAGE TYPE |
| MME UE S1AP ID | IDENTIFICATION OF UE ASSOCIATION ON S1 INTERFACE IN MME |
| eNB UE S1AP ID | IDENTIFICATION OF UE ASSOCIATION ON S1 INTERFACE IN eNB |
| Handover Type | HANDOVER TYPE (BETWEEN LTEs, LTE-3G, ETC.) |
| SAE Bearers Subject to Forwarding List | 0 |
| >SAE Bearers Subject to Forwarding Item Ies | |
| >> SAE Bearer ID | RADIO ACCESS BEARER. ASSINED WHEN UE COMMUNICATES USING NETWORK, AND RELEASED WITH TERMINATION OF COMMUNCIATION |
| >> DL Transport Layer Address | TRANSPORT LAYER ADDRESS |
| >> DL GTP TEID | GTP TUNNEL END POINT IDENTIFIER |
| SAE Bearers to Release List | 0 |
| >SAE Bearers to Release Item IEs | |
| >> SAE Bearer ID | RADIO ACCESS BEARER. ASSINED WHEN UE COMMUNICATES USING NETWORK, AND RELEASED WITH TERMINATION OF COMMUNCIATION |
| Intra-LTE HO Information ListResponse | C- ifIntraLTE |
| > Target eNodeB to Source eNodeB Transparent Container | M |
| LTE to UTRAN HO Information ListResponse | C- ifILTEto UTRAN |
| > Target RNC to Source RNC Transparent Container | M |
| LTE to GERAN HO Information ListResponse | C- ifILTEto GERAN |
| > Target BSS to Source BSS Transparent Container | M |
| Criticality Diagnostics | USED FOR NOTIFICATION TO MESSAGE TRANSMISSION SOURCE WHEN THERE IS PROBLEM ⇒DETAILS ARE ILLUSTRATED IN (FIG. 22) |
| Global eNB ID (ADDED) | ID OF Target eNB |
| IP ADDRESS (ADDED) | IP ADDRESS OF Target eNB |
| PORT NUMBER (ADDED) | PORT NUMBER OF Target eNB |

FIG. 9

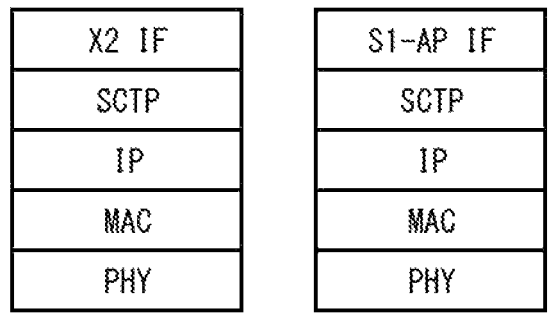
F I G. 1 1

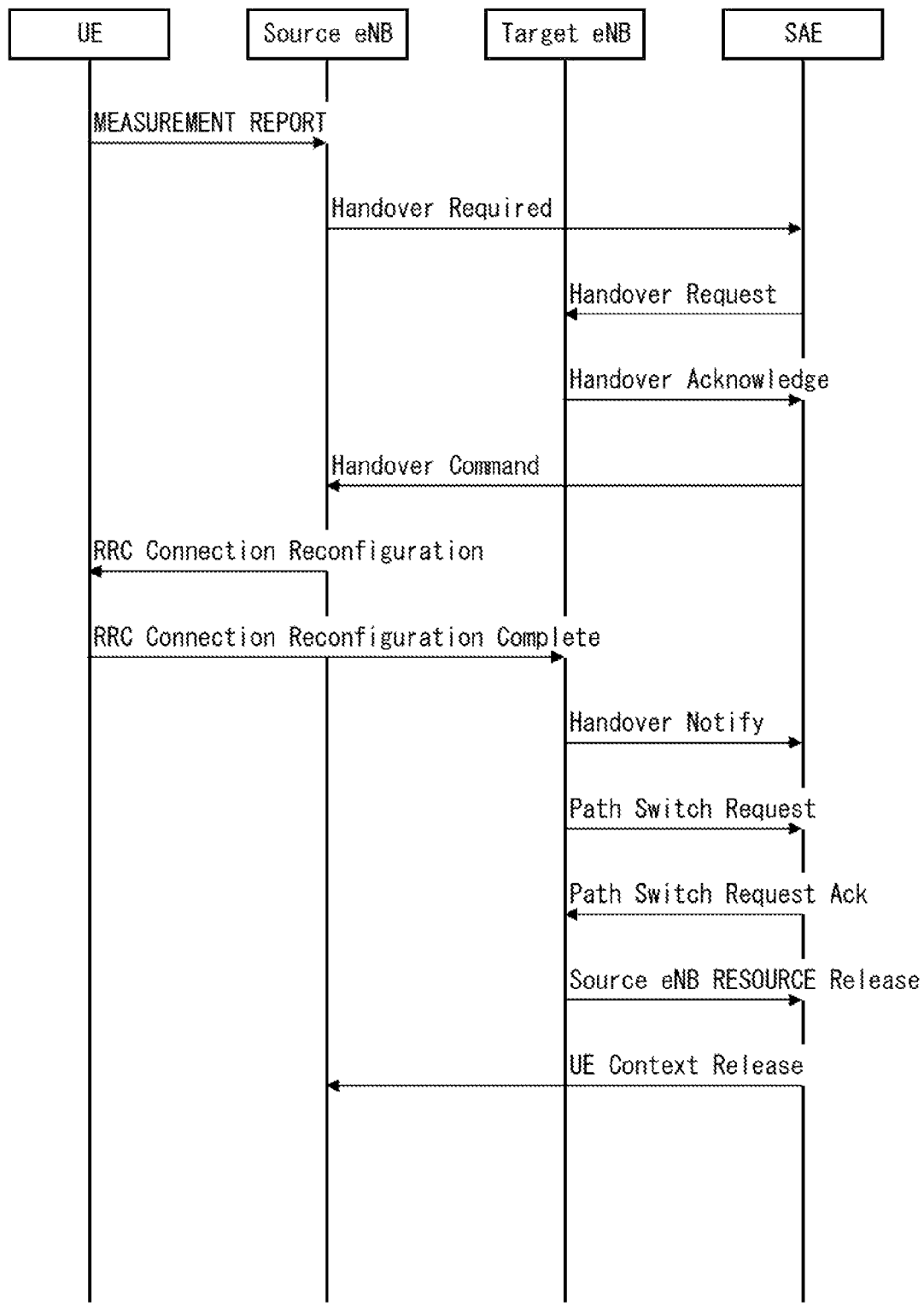
F I G. 13

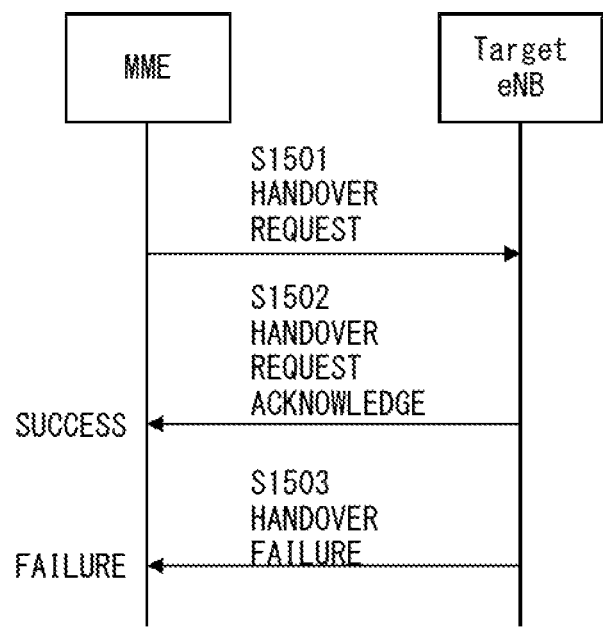
F I G. 15

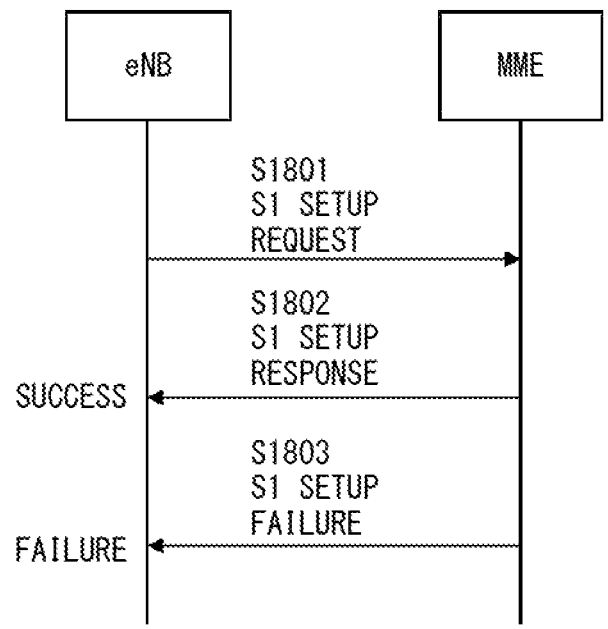
F I G. 1 8

| IE/Group Name | USAGE |
|---|---|
| Message Type | MESSAGET TYPE |
| MME UE S1AP ID | IDENTIFICATION OF UE ASSOCIATION ON S1 INTERFACE IN MME |
| eNB UE S1AP ID | IDENTIFICATION OF UE ASSOCIATION ON S1 INTERFACE IN eNb |
| Handover Type | HANDOVER TYPE (BETWEEN LTEs, LTE-3G, ETC.) |
| Cause | TO REPRESENT AN EVENT OCCURRED IN S1-AP PROTOCOL |
| Target ID | IDENTIFICATION OF HANDOVER DESTINATION (e.g. the target Global eNB-ID (for intra SAE/LTE)) |
| Selected TAI | IDENTIFICATION OF TRACKING AREA |
| Direct Forwarding Path Availability | AVAILABILITY OF PATH DETERMINED BY Source eNB |
| Intra-LTE HO Information ListRequest<br><br>> Source eNodeB to Target eNodeB<br><br>Transparent Container | USED WITH HANDOVER BETWEEN LTEs<br><br>INFORMATION ELEMENT TRANSMITTED FROM Source eNB to Target eNB as Transparent Container |
| LTE to UTRAN HO Information ListRequest | |
| LTE to GERAN HO Information ListRequest | |

FIG. 19

| IE/Group Name | USAGE |
|---|---|
| Message Type | MESSAGE TYPE |
| MME UE S1AP ID | IDENTIFICATION OF UE ASSOCIATION ON S1 INTERFACE IN MME |
| Handover Type | HANDOVER TYPE (BETWEEN LTEs, LTE-3G, ETC.) |
| Cause | TO REPRESENT AN EVENT OCCURRED IN S1-AP PROTOCOL |
| UE Aggregate Maximum Bit Rate | MAXIMUM BIT RATE (UL/DL) |
| SAE Bearers To Be Setup List | |
| >SAE Bearers To Be Setup Item IEs | |
| >> SAE Bearer ID | RADIO ACCESS BEARER ASSINED WHEN UE COMMUNICATES USING NETWORK, AND RELEASED WITH TERMINATION OF COMMUNCIATION |
| >> Transport Layer Address | TRANSPORT LAYER ADDRESS |
| >> GTP TEID | GTP TUNNEL END POINT IDENTIFIER (BETWEEN eNB-Serving Gateway) |
| >> SAE Bearer Level QoS Parameters | QoS PARAMETERS CORRESPONDING TO SAE BEARER |
| Source eNodeB to Target eNodeB Transparent Container | INFORMATION ELEMENT TRANSMITTED FROM Source eNB to Target eNB as Transparent Container |
| Handover Restriction List | TO REPRESENT ROAMING AND ACCESS RESTRICTION AREAS |
| Trace Activation | PARAMETER RELATED TO TRACE ACTIVATION |
| Request Type | TYPE OF eNB LOCATION REQUEST |

FIG. 20

| IE/Group Name | USAGE |
|---|---|
| Message Type | MESSAGE TYPE |
| MME UE S1AP ID | IDENTIFICATION OF UE ASSOCIATION ON S1 INTERFACE IN MME |
| eNB UE S1AP ID | IDENTIFICATION OF UE ASSOCIATION ON S1 INTERFACE IN eNB |
| Handover Type | HANDOVER TYPE (BETWEEN LTEs, LTE-3G, ETC.) |
| SAE Bearers Subject to Forwarding List | 0 |
| >SAE Bearers Subject to Forwarding Item Ies | |
| >> SAE Bearer ID | RADIO ACCESS BEARER ASSINED WHEN UE COMMUNICATES USING NETWORK, AND RELEASED WITH TERMINATION OF COMMUNCIATION |
| >> DL Transport Layer Address | TRANSPORT LAYER ADDRESS |
| >> DL GTP TEID | GTP TUNNEL END POINT IDENTIFIER |
| SAE Bearers to Release List | 0 |
| >SAE Bearers to Release Item IEs | |
| >> SAE Bearer ID | RADIO ACCESS BEARER ASSINED WHEN UE COMMUNICATES USING NETWORK, AND RELEASED WITH TERMINATION OF COMMUNCIATION |
| Intra-LTE HO Information ListResponse | C- ifIntraLTE |
| > Target eNodeB to Source eNodeB Transparent Container | M |
| LTE to UTRAN HO Information ListResponse | C- ifILTEto UTRAN |
| > Target RNC to Source RNC Transparent Container | M |
| LTE to GERAN HO Information ListResponse | C- ifILTEto GERAN |
| > Target BSS to Source BSS Transparent Container | M |
| Criticality Diagnostics | USED FOR NOTIFICATION TO MESSAGE TRANSMISSION SOURCE WHEN THERE IS PROBLEM ⇒DETAILS ARE ILLUSTRATED IN (FIG. 22) |

FIG. 21

| IE/Group Name | USAGE |
|---|---|
| Procedure Code | Procedure Code is to be used if Criticality Diagnostics is part of Error Indication procedure, and not within the response message of the same procedure that caused the error. |
| Triggering Message | The Triggering Message is used only if the Criticality Diagnostics is part of Error Indication procedure. |
| Procedure Criticality | This Procedure Criticality is used for reporting the Criticality of the Triggering message (Procedure). |
| Information Element Criticality Diagnostics | |
| >IE Criticality | The IE Criticality is used for reporting the criticality of the triggering IE. The value 'ignore' shall not be used. |
| >IE ID | The IE ID of the not understood or missing IE |
| >Type of Error | ERROR TYPE |

FIG. 22

| IE/Group Name | USAGE |
|---|---|
| Message Type | MESSAGE TYPE |
| Global eNB ID | Global eNB ID |
| Served Cells | |
| >Served Cell Information | INFORMATION OF CELL PROVIDING SERVICE FOR UE (INCLUDING ADJACENT CELL INFORMATION OF eNB and the like) |
| GU Group Id List | |
| >GU Group Id | INCLUDING PLMN AND MME Group ID |

F I G. 2 3

| IE/Group Name | USAGE |
|---|---|
| Message Type | MESSAGE TYPE |
| Global eNB ID | Global eNB ID |
| Served Cells | |
| >Served Cell Information | INFORMATION OF CELL PROVIDING SERVICE FOR UE (INCLUDING ADJACENT CELL INFORMATION OF eNB and the like) |
| GU Group Id List | |
| >GU Group Id | INCLUDING PLMN AND MME Group ID |
| Criticality Diagnostics | USED FOR NOTIFICATION TO MESSAGE TRANSMISSION SOURCE WHEN THERE IS PROBLEM |

F I G. 2 4

| IE/Group Name | Presence |
|---|---|
| Message Type | MESSAGE TYPE |
| Global eNB ID | Global eNB ID |
| eNB Name | eNB NAME |
| Supported TAs | Supported TAs in the eNB |
| >TAC | Broadcast TAC |
| >Broadcast PLMNs | Broadcast PLMNs |
| >>PLMN Identity | IDENTIFICATION OF PLMN. Mobile Country Code (MCC) AND Mobile Network Code (MNC). |

F I G. 2 5

INTERFACE ESTABLISHING METHOD IN RADIO COMMUNICATION SYSTEM, MANAGEMENT APPARATUS AND RADIO NODE APPARATUS IN RADIO COMMUNICATION SYSTEM

CROSS-REFERENCE TO RELATED APPLICATIONS

This application is based upon and claims the benefit of priority of the prior Japanese Patent Application No. 2009-080905, filed on Mar. 30, 2009, the entire contents of which are incorporated herein by reference.

FIELD

The invention relates to an interface establishing method, a management apparatus, and a radio node apparatus used in radio communication system.

BACKGROUND

A standardization organization 3GPP (3rd Generation Partnership Project) is developing a radio access network technique, which is called UTRAN LTE (Universal Terrestrial Radio Access Network Long Term Evolution), for the next-generation mobile communication system. For the core-network, SAE (System Architecture Evolution) is being developed.

The LTE is being developed with an expectation of realizing the functions of a conventional radio base station (Node-B) and a radio base station controller (RNC: Radio Network Controller) in a single node, which is called eNB (evolved Node B).

FIG. 10 is a diagram illustrating a configuration example of the IMT-2000 LTE/SAE system based on the above development. The system includes a UE (User Equipment) 1001, an LTE 1002, an SAE 1003, and an IP service network 1004. The LTE 1002 is called E-UTRAN, in which eNBs 1002-1 are disposed. In the SAE 1003, an MME (Mobility Management Entity) 1003-1, a Serving Gateway 1003-2, an HSS (Home Subscriber Server) 1003-3, a PDN (Packet Data Network) Gateway 1003-4, and a PCRF (Policy Charging Rule Function) 1003-5 are disposed. The IP service network 1004 is a function unit that provides application services (multimedia communication, packet communication), and includes various server groups that provide application services such as IMS (IP Multimedia Service) and PSS (Packet Switching Service).

For the IMT-2000 LTE/SAE system, the interface between eNBs is called an X2 interface, and the interface between an eNB and an MME/SAE is called an S1-AP interface. The protocol stacks of the X2 interface and the S1-AP interface are illustrated in FIG. 11.

A mobile phone or a PHS (Personal Handyphone System) with mobile communication that adopts the cell system cannot continue communication when the signal from a base station weakens as the terminal moves to the cell boundary or due to other reasons. Therefore, when the signal weakens or before the signal weakens, a procedure called handover (H/O, H. O.) is performed to switch the connection to a base station of another cell with a strong signal.

For the handover in the IMT2000 LTE/SAE system, there are two types, namely, (1) handover using the X2 interface and (2) handover using the S1-AP interface.

The handover using the X2 interface is a handover procedure performed when the X2 interface between a handover-source eNB 1002-1 (Source eNB) and a handover-destination eNB 1002-1 (Target eNB) is established. The MME 1003-1 is not involved in the handover control. The operation sequence of the handover using the X2 interface is illustrated in FIG. 12.

The handover using the S1-AP interface is a handover procedure performed when the X2 interface between a Source eNB 1002-1 and a Target eNB 1002-1 are not established. This procedure is performed in different ways depending on whether the Source eNB 1002-1 and the Target eNB 1002-1 belong to the same MME 1003-1 or to different MMEs 1003-1. The operation sequence of the handover using the S1-AP interface (where the Source eNB 1002-1 and the Target eNB 1002-1 belong to the same MME 1003-1) is illustrated in FIG. 13.

Respective procedures in using the handover procedure of an S1-AP message during the handover between eNBs 1002-1 that do not go beyond the MME 1003-1 are described below.

FIG. 14 is an operation sequence diagram of the HANDOVER PREPARATION procedure (S1-AP).

In the handover between eNBs 1002-1 that do not go beyond the MME 1003-1, first, the Source eNB 1002-1 receives a handover request (RRC: MEASUREMENT REPORT) from the UE 1001. Then, a check is performed, from Target eNB information in the handover request, as to whether the X2 interface between the Source eNB and the Target eNB has been activated. When it is determined that the X2 interface has not been activated yet as a result of the check, the Source eNB 1002-1 sends a handover request (S1-AP: HANDOVER REQUIRED) to the MME 1003-1. (FIG. 14, S1401). The response (success or failure) is determined depending on the success (S1402) or failure (S1403) of the HANDOVER RESOURCE ALLOCATION procedure illustrated in FIG. 15.

FIG. 15 is an operation diagram of the HANDOVER RESOURCE ALLOCATION procedure (S1-AP).

First, the MME 1003-1 receives an S1-AP: HANDOVER REQUIRED (FIG. 14, S1401). Then, the MME 1003-1 checks, from I.E (information of the Target eNB and so on) in the HANDOVER REQUIRED, whether the Target eNB 1002-1 is not beyond the MME 1003-1 (the Target eNB 1002-1 exists under the MME) or the Target eNB 1002-1 is beyond the MME 1003-1 (the Target eNB 1002-1 does not exist under the MME). When it is determined that the Target eNB 1002-1 is not beyond the MME 1003-1 as a result of the check, the MME 1003-1 sends a handover request (d2S1-AP: HANDOVER REQUEST) to the Target eNB 1002-1 (FIG. 15, S1501).

Upon receiving the S1-AP: HANDOVER REQUEST, the Target eNB 1002-1 performs the resource capture at the Target eNB side for the handover, and the like, and returns the response (success (S1502) or failure (S1503)) on the request to the MME 1003-1. Then the MME 1003-1 returns, based on the response result on the request, the response (FIG. 14, S1402 or S1403) in the HANDOVER PREPARATION procedure to the Source eNB 1002-1.

FIG. 16 is an operation sequence diagram of the HANDOVER NOTIFICATION procedure (S1-AP).

The Target eNB 1002-1 gives, to the MME 1003-1, a notification that the UE 1001 has been connected to the cell of the Target eNB 1002-1, and the S1-AP handover has been completed (FIG. 16, S1601).

FIG. 17 is an operation sequence diagram of the X2 setup procedure (X2-IF).

In this procedure, data exchange at the application level that is required between the eNBs 1002-1 for the accurate interoperation is performed. First, an X2 SETUP REQUEST is transmitted from the transmission-source eNB 1002-1 to the transmission-destination eNB 1002-1 (S1701). Then, a success response X2 SETUP RESPONSE (S1702) or a failure response X2 SETUP FAILURE (S1703) is returned from the transmission-destination eNB 1002-1 to the transmission-source eNB 1002-1.

FIG. 18 is an operation sequence diagram of the S1 setup procedure (S1-AP).

In this procedure, data exchange at the application level that is required for the eNB 1002-1 and the MME 1003-1 for realizing the appropriate communication on the S1-AP interface is performed. First, an S1 SETUP REQUEST is transmitted from the transmission-source eNB 1002-1 to the transmission-destination MME 1003-1 (S1801). Then, a success response S1 SETUP RESPONSE (S1802) or a failure response S1 SETUP FAILURE (S1803) is returned from the transmission-destination MME 1003-1 to the transmission-source eNB 1002-1.

The message formats used in the S1-AP handover and X2 setup procedure (X2-IF) are illustrated in FIG. 19 through FIG. 25. FIG. 19 is the format of the HANDOVER REQUIRED (S1-AP) message. FIG. 20 is the format of the HANDOVER REQUEST (S1-AP) message. FIG. 21 is the format of the HANDOVER COMMAND (S1-AP) message. FIG. 22 is the format of the S1-AP I.E Criticality Diagnostics message. FIG. 23 is the format of the X2 SETUP REQUEST (X2-IF) message. FIG. 24 is the format of the X2 SETUP RESPONSE (X2-IF) message. FIG. 25 is the format of the S1 SETUP REQUEST (S1-AP) message.

In the handover between eNBs 1002-1, in order to prevent the data loss, the Source eNB 1002-1 may perform Data forwarding of the user data to the Target eNB 1002-1.

FIG. 26 illustrates the data forwarding with the handover using the X2 interface.

It is assumed that before the handover, data d1, d2, d3, d4, d5, d6 were sent from a Serving Gateway 1003-2 to a Source eNB 1002-1. Here, if the handover (H.O.) occurs in a state in which the data d1, d2, d3 have reached the UE 1001, the Source eNB 1002-1 performs the Data forwarding, to the Target eNB 1002-1 by means of the X2 interface, of the data d4, d5, d6 that have not been transmitted to the UE 1001. During the handover procedure, the path switch from the Source eNB 1002-1 to the Target eNB 1002-1 is performed, and the subsequent data d7, d8, d9 are transmitted from the Serving Gateway 1003-2 to the Target eNB 1002-1.

FIG. 27 illustrates the data forwarding with the handover using the S1 interface.

It is assumed that before the handover, the data d1, d2, d3, d4, d5, d6 were sent from the Serving Gateway 1003-2 to the Source eNB 1002-1. Here, if the handover occurs in the state in which the data d1, d2, d3 have reached the UE 1001, the Sour eNB 1002-1 performs the Data forwarding, to the Target eNB 1002-1 via the Serving Gateway 1003-2, of the data d4, d5, d6 that have not been transmitted to the UE 1001. During the handover procedure, the path switch from the Source eNB 1002-1 to the Target eNB 1002-1 is performed, and the subsequent data d7, d8, d9 are transmitted from the Serving Gateway 1003-2 to the Target eNB 1002-1.

Note that related art may be described, for example, in Japanese Laid-open Patent Publication No. 2008-103865 and Japanese Laid-open Patent Publication No. 2008-227772.

For the handover between LTEs 1002 illustrated in FIG. 10, the 3GPP defines that when it is made via the SAE 1003, the S1-AP interface is used, and when it is not made via the SAE 1003, the X2 interface is used. The S1-AP interface corresponds to the inter-station link between the eNB 1002-1 and the SAE 1003, and the X2 interface corresponds to the inter-station link between the eNBs 1002-1.

In the conventional art, the inter-station link is set up or cancelled with the addition or reduction of an eNB 1002-1, and is set up to all adjacent radio base stations.

However, since resources that are required for the setting of the inter-station link are limited, if the inter-station link is set up for all eNBs 1002-1, there is a risk of resource shortage. Here, the number of adjacent eNBs 1002-1 may increase due to the operation of a Home eNB (home base station) and the like.

In addition, since the inter-station link is set on SCTP (Stream Control Transmission Protocol), the exchange of a message with an adjacent eNB 1002-1 takes place due to the HEATBEAT function of the SCTP, even in a state under which no communication is performed. As a result, the processing load may increase.

Therefore, in the IMT-2000 LTE/SAE system, it is expected that setting the X2 interface (inter-station link) for all adjacent eNB 1002-1 at the time with resume or addition is not practical. However, if many handovers occur while X2 interface is not set between eNBs 1002-1, the handover using the S1-AP interface takes place many times. As a result, the load for SAE may increase and available line band and resources for the S1-AP interface may be reduced, which is expected to cause the degradation of the handover service.

SUMMARY

According to an aspect of the invention, an interface establishing method in a handover procedure to perform a handover using a first link established between radio node apparatuses or a second link established between a radio node apparatus and a management apparatus that manages a plurality of radio node apparatuses in a radio communication system, the method includes: managing an occurrence status of handover for the plurality of radio node apparatuses; transmitting an establishment instruction from the management apparatus to a first radio node apparatus to establish the first link between the first radio node apparatus and a second radio node apparatus according to the occurrence status of handover, the first radio node apparatus and the second radio node apparatus being accommodated in the management apparatus; and establishing the first link between the first radio node apparatus and the second radio node apparatus based on the establishment instruction.

According to another aspect of the invention, a management apparatus that accommodates a plurality of radio node apparatuses and controls a handover between the plurality of radio node apparatuses in a radio communication system, includes: a processing unit configured to issue an establishment instruction to establish a link for a handover between a first radio node apparatus and a second radio node apparatus according to occurrence status of handover for the plurality of radio node apparatuses, and to transmit the establishment instruction to the first radio node apparatus.

According to still another aspect of the invention, a radio node apparatus that performs a handover with another radio node apparatus using a first link established between the radio node apparatus and the other radio node apparatus or a second link established between the radio node apparatus and a management apparatus that accommodates the radio node apparatus in a radio communication system, includes: a processing unit configured to establish the first link with the other radio node apparatus based on an establishment instruction received from the management apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a configuration of an embodiment of the radio communication system.

FIG. 5 is a diagram illustrating a configuration example of an inter-station link status table held by an eNB.

FIG. 6 is a diagram illustrating a configuration example of an inter-station link status table held by an SAE.

FIG. 7 is a diagram illustrating a configuration example of a handover occurrence management table held by the SAE.

FIG. 8 is a diagram illustrating a configuration example of a handover occurrence management table held by the eNB.

FIG. 9 is a diagram illustrating an example of data structure of the S1-AP: HANDOVER COMMAND according to the embodiment.

FIG. 11 is a diagram illustrating the protocol stacks of the X2 interface and the S1-AP interface.

FIG. 13 is an operation sequence diagram of the handover using the S1-AP interface (where the eNBs belong to the same MME).

FIG. 15 is an operation sequence diagram of the HANDOVER RESOURCE ALLOCATION procedure (S1-AP).

FIG. 18 is an operation sequence diagram of the S1 setup procedure (S1-AP).

FIG. 19 is a diagram illustrating the format of the HANDOVER REQUIRED (S1-AP) message.

FIG. 20 is a diagram illustrating the format of the HANDOVER REQUEST (S1-AP) message.

FIG. 21 is a diagram illustrating the format of the HANDOVER COMMAND (S1-AP) message.

FIG. 22 is a diagram illustrating the format of the S1-AP I.E Criticality Diagnostics message.

FIG. 23 is a diagram illustrating the format of the X2 SETUP REQUEST message.

FIG. 24 is a diagram illustrating the format of the X2 SETUP RESPONSE message.

FIG. 25 is a diagram illustrating the format of the S1 SETUP REQUEST message.

DESCRIPTION OF EMBODIMENTS

Hereinafter, embodiments are described in detail.

Figure 10:
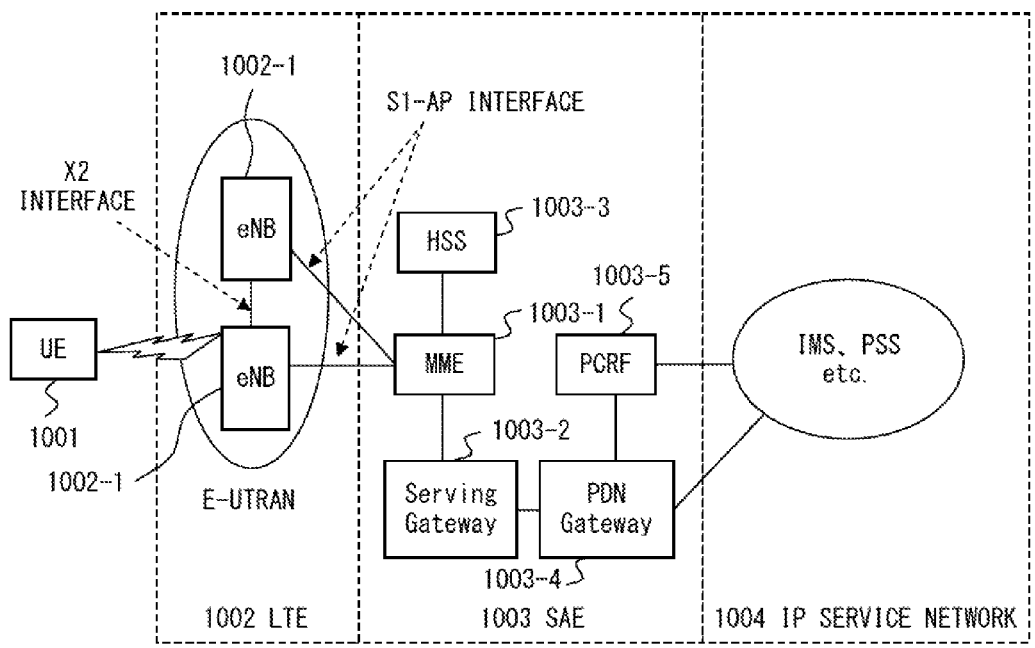
FIG. 10 is a diagram illustrating a configuration example of the IMT-2000 LTE/SAE system.

The radio communication system of the embodiment is realized, for example, on the IMT-2000 LTE/SAE system illustrated in FIG. 10.

FIG. 1 is a diagram illustrating a configuration of an embodiment of the radio communication system. An SAE 100 in FIG. 1 corresponds to the MME 1003-1 in the SAE 1003 in FIG. 10. Meanwhile, an eNB 200 in FIG. 1 corresponds to the eNB 1002-1 in the LTE 1002 in FIG. 10. The SAE 100 may accommodate and manages a plurality of eNBs 200. That is, the SAE 100 may operate as an upper layer apparatus for the eNBs 200. In the radio communication system of the embodiment, an inter-station link may be established between eNBs 200 according to the X2 interface, and an inter-station link may be established between the eNB 200 and the SAE 100 according to the S1-AP interface.

The SAE 100 has a signal transmission/reception unit 101, a signal analysis unit 102, a handover processing unit 103, a new information management unit 104, an inter-station link establishing unit 105, an inter-station link status table 106, and a handover occurrence management table 107.

The eNB 200 has a signal transmission/reception unit 201, a signal analysis unit 202, a handover processing unit 203, a new information management unit 204, an inter-station link establishing unit 205, an inter-station link status table 206, and a handover occurrence management table 207.

The establishing operation of the X2 interface in the embodiment having the above configuration is described below.

Figure 2:
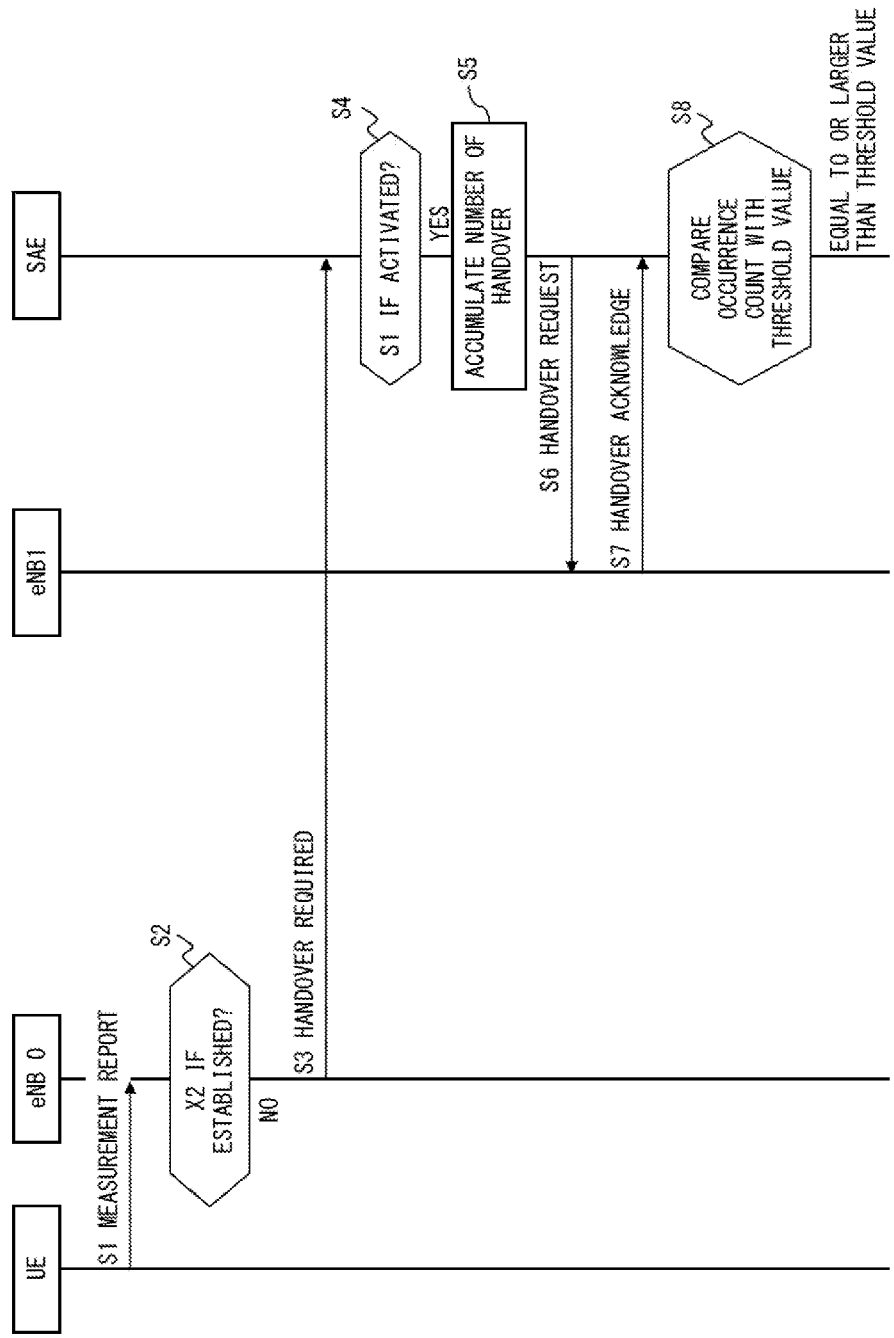
FIG. 2 and FIG. 3 are sequence diagrams of the establishing operation of the X2 interface according to the embodiment.
Figure 3:
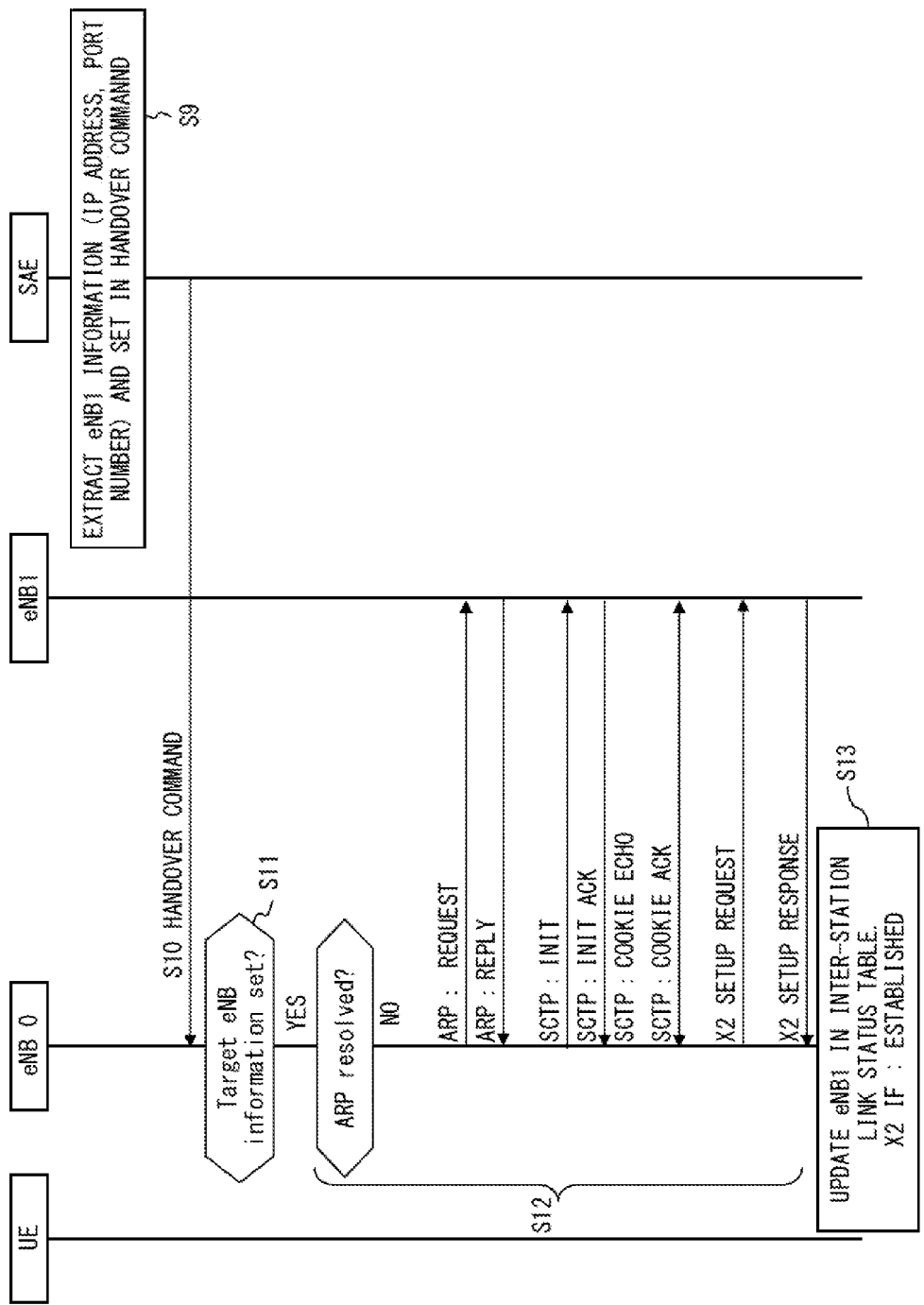

FIG. 2 and FIG. 3 are sequence diagrams of the establishing operation of the X2 interface in the embodiment. Hereinafter, the explanation is made with these operation sequence diagrams. The eNB0 and eNB1 illustrated in FIG. 2 and FIG. 3 may operate as a source eNB 200 and a target eNB 200, respectively.

Upon receiving a signal sent from an UE (not specifically illustrated in FIG. 1), the signal transmission/reception unit 201 of the source eNB 200 transmits a notification of the reception signal to the signal analysis unit 202. The signal analysis unit 202 analyzes the transmitted reception signal. When a handover request (RRC: MEASUREMENT REPORT) is detected as a result of the signal analysis, the signal analysis unit 202 transmits the handover request (RRC: MEASUREMENT REPORT) to the handover processing unit 203 (FIG. 2, S1).

Based on Target eNB information in the RRC: MEASUREMENT REPORT, the handover processing unit 203 sends, to the inter-link establishing unit 205, an inquiry to check whether the X2 interface with the Target eNB 200 has been established (FIG. 2, S2). The inter-station link establishing unit 205 refers to the inter-station link status table 206 to check whether the X2 interface has been established, and sends the result to the handover processing unit 203.

FIG. 5 is a diagram illustrating a configuration example of the inter-station link status table 206 held by the eNB 200. As illustrated in FIG. 5, the inter-station link status table 206 stores, for every connectable eNB 200, the ID, IP address, port number of the eNB, and the status indicating whether the X2 interface (X2 IF) has been established (established/not established). The inter-station link establishing unit 205 searches, in the inter-station link status table 206 illustrated in FIG. 5, the ID corresponding to the Target eNB information sent from the handover processing unit 203, and checks whether the X2 interface corresponding to the ID has been established. The inter-station link establishing unit 205 sends a notification indicating whether the X2 interface has been established to the handover processing unit 203.

Upon receiving a notification that the X2 interface has not been established from the inter-station link establishing unit 205, the handover processing unit 203 transmits a handover request (S1-AP: HANDOVER REQUIRED) to the SAE 100 via the signal transmission/reception unit 201 (FIG. 2, S3).

Upon receiving a signal transmitted from the signal transmission/reception unit 201 of the Source eNB 200, the signal transmission/reception unit 101 of the SAE 100 transmits the reception signal to the signal analysis unit 102. The signal analysis unit 102 analyzes the reception signal. When a handover request (S1-AP: HANDOVER REQUIRED) is detected as a result of the signal analysis, the signal analysis unit 102 sends the handover request (S1-AP: HANDOVER REQUIRED) to the handover processing unit 103.

Based on Target eNB information in the S1-AP: HANDOVER REQUIRED, the handover processing unit 103 sends, to the inter-station link establishing unit 105, an inquiry to check whether or not the Target eNB 200 exists under the SAE 100 (whether or not the S1 interface has been activated) (FIG. 2, S4). The inter-station link establishing unit 105 refers to the inter-station link status table 106 to check whether or not the Target eNB 200 exists under the SAE 100, that is, inter-station link establishing unit 105 detects the presence/absence of the involvement of another SAE 100 by checking the inter-station link status table 106.

FIG. 6 is a diagram illustrating a configuration example of the inter-station link status table 106 held by the SAE 100. As illustrated in FIG. 6, the inter-station link status table 106 stores, for every connectable eNB 200, the ID, IP address, port number of the eNB, and the status indicating whether the S1-AP interface (S1-AP IF) has been established (established/not established). The inter-station link establishing unit 105 searches, in the inter-station link status table 106 illustrated in FIG. 6, the ID corresponding to the Target eNB information sent from the handover processing unit 103, and checks whether the S1-AP interface corresponding to the ID has been established. The inter-station link establishing unit 105 sends a notification indicating whether the S1-AP interface has been established to the handover processing unit 203.

The description below is about the control sequence for the case without the involvement of another SAE 100. For the case with the involvement of another SAE 100, the conventional handover processing between SAEs 100 is performed.

Upon receiving a notification from the inter-station link establishing unit 105 that the S1-AP interface has been established for a Target eNB 200, that is, there is no involvement of another SAE 100, the handover processing unit 103 performs the following process.

Figure 7:
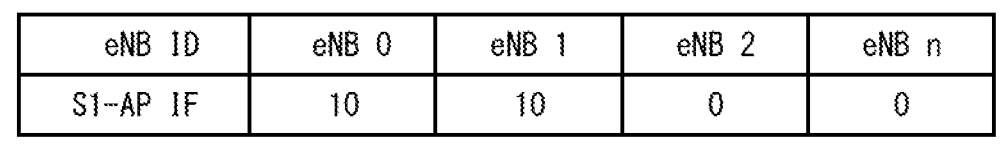

The handover processing unit 103 accumulates the number of the occurrence of the handover (hereinafter, handover occurrence count HOC) to the Target eNB 200 in the entry corresponding to the Target eNB 200 in the handover occurrence management table 107 (FIG. 2, S5). FIG. 7 illustrates an example of the handover occurrence management table 107 held by the SAE 100. As illustrated in FIG. 7, the handover occurrence management table 107 stores, for every eNB 200 under the SAE 100, the ID of the eNB 200, and the number of the S1-AP interfaces (S1-AP IF). That is, the handover occurrence management table 107 manages, for each eNB 200, the occurrence frequency of the handover using the S1-AP interface with which another SAE 100 is not involved. Now, when a handover to the Target eNB 200 is newly requested, the handover processing unit 103 increments the handover occurrence count HOC by "1" in the entry of the ID corresponding to the Target eNB 200 in the handover occurrence management table 107. Meanwhile, the handover processing unit 103 decrements the handover occurrence count HOC by "1" in the entry after the completion of the handover process (including the failure of the handover).

Note that the process of S5 in FIG. 2 described above is an example of the handover occurrence status management step or the handover occurrence status management unit.

Next, the handover processing unit 103 performs the handover procedure by means of the S1-AP interface for the Target eNB 200 (FIG. 2, S7, S8), and terminates the handover process for the Target eNB 200. This handover procedure may be realized by the conventional sequence, for example, illustrated in FIG. 13 and so on.

In parallel with the above process, the handover processing unit 103 sends, to the new information management unit 104, a handover request (S1-AP: HANDOVER REQUIRED) from the Source eNB 200 to the Target eNB 200.

Upon receiving the transmission instruction, the new information management unit 104 operates asynchronously with the handover process (FIG. 2, S7, S8) for the Target eNB 200 performed by the handover processing unit 103. The new information management unit 104 refers to the handover occurrence management table 107 to obtain the handover occurrence count HOC for the Target eNB 200, and compares the obtained handover occurrence count HOC with a predetermined threshold value (FIG. 2, S8).

When the handover occurrence count HOC is smaller than the threshold value, the new information management unit 104 terminates the current process without doing anything.

When the handover occurrence count HOC is equal to or larger than the threshold value, the new information management unit 104 determines that the occurrence frequency of the handover between the Source eNB 200 and the Target eNB 200 is increasing, and performs the control to establish the X2 interface between the Source eNB 200 and the Target eNB 200.

Specifically, the new information management unit 104 extracts the ID, IP address and port number of the Target eNB 200 from the inter-station link status table 106, and sends the extracted information to the handover processing unit 103. When the handover processing unit 103 transmits the S1-AP: HANDOVER COMMAND with respect to the handover process to the Source eNB 200, the handover processing unit 103 adds the ID, IP address and port number of the Target eNB 200 to the HANDOVER COMMAND message (FIG. 3, S9). Then, the handover processing unit 103 transmits the S1-AP: HANDOVER COMMAND to the Source eNB 200 through the signal transmission/reception unit 101 (FIG. 3, S10).

FIG. 9 illustrates an example of data structure of the S1-AP: HANDOVER COMMAND in the embodiment. In the message of the embodiment, the ID, IP address and port number of the Target eNB 200 are added. The ID, IP address and port number of the Target eNB 200 may be added, for example, to the last three rows of the message.

Note that the processes in S9 and S10 in FIG. 3 described above are examples of the inter-station link establishment instructing step or an inter-station link establishment instructing unit.

Upon receiving a signal transmitted from the signal transmission/reception unit 101 of the SAE 100, the signal transmission/reception unit 201 of the Source eNB 200 transmits the reception signal to the analysis unit 202, The analysis unit 202 analyzes the reception signal. When an S1-AP: HANDOVER COMMAND is detected as a result of the signal analysis, the signal analysis unit 202 sends the S1-AP: HANDOVER COMMAND to the handover processing unit 203.

Upon receiving the S1-AP: HANDOVER COMMAND, the handover processing unit 203 instructs the new information management unit 204 to check the presence/absence of the setting of the Target eNB information in the S1-AP: HANDOVER COMMAND message. The new information management unit 204 checks the presence/absence of the setting of the Target eNB information in the S1-AP: HANDOVER COMMAND message. If the information has been set, the new information management unit 204 sends a notification of the presence of the setting to the inter-station link establishing unit 205 (FIG. 3, decision in S11 is YES).

Figure 17:
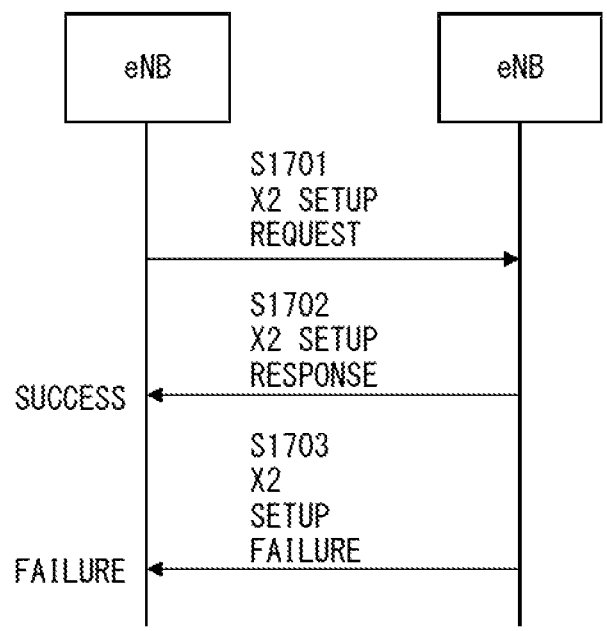
FIG. 17 is an operation sequence diagram of the X2 setup procedure (X2-IF).
Figure 26:
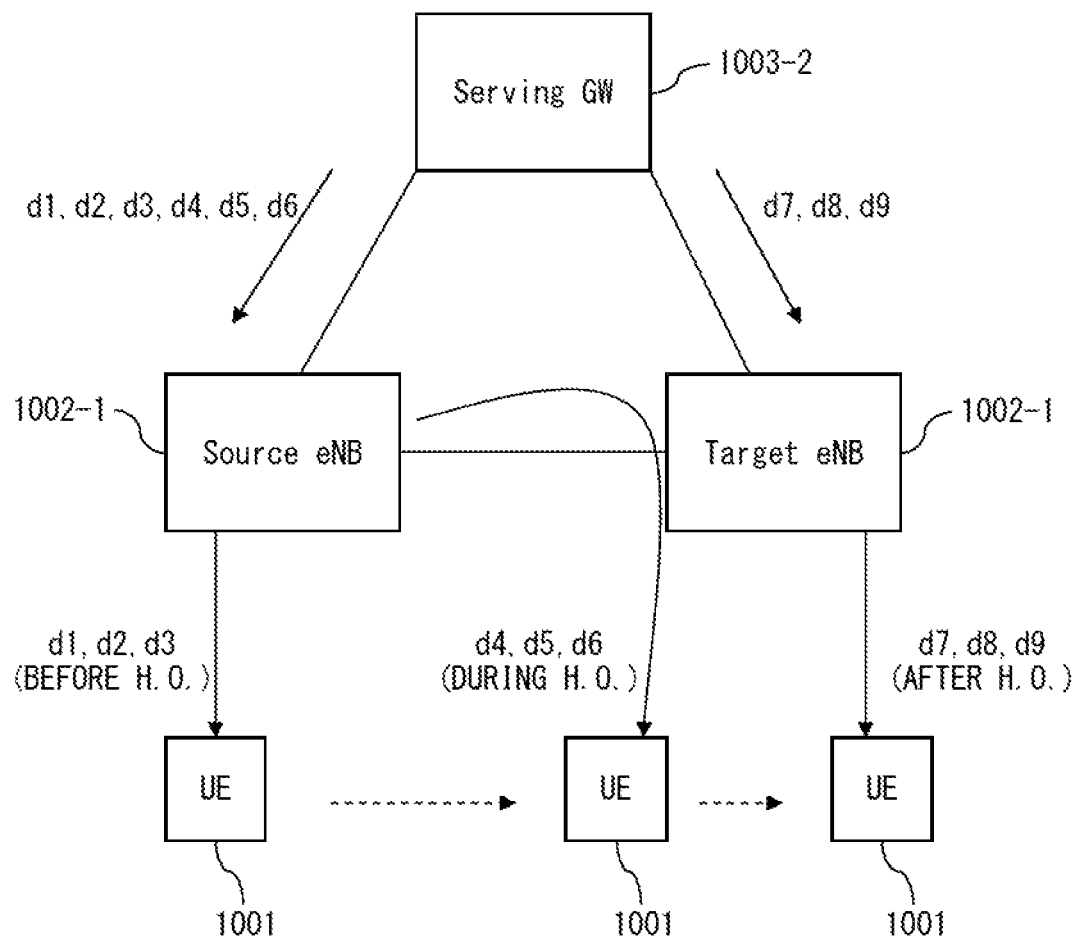
FIG. 26 is an illustration of the data forwarding in the handover using the X2 interface.
Figure 27:
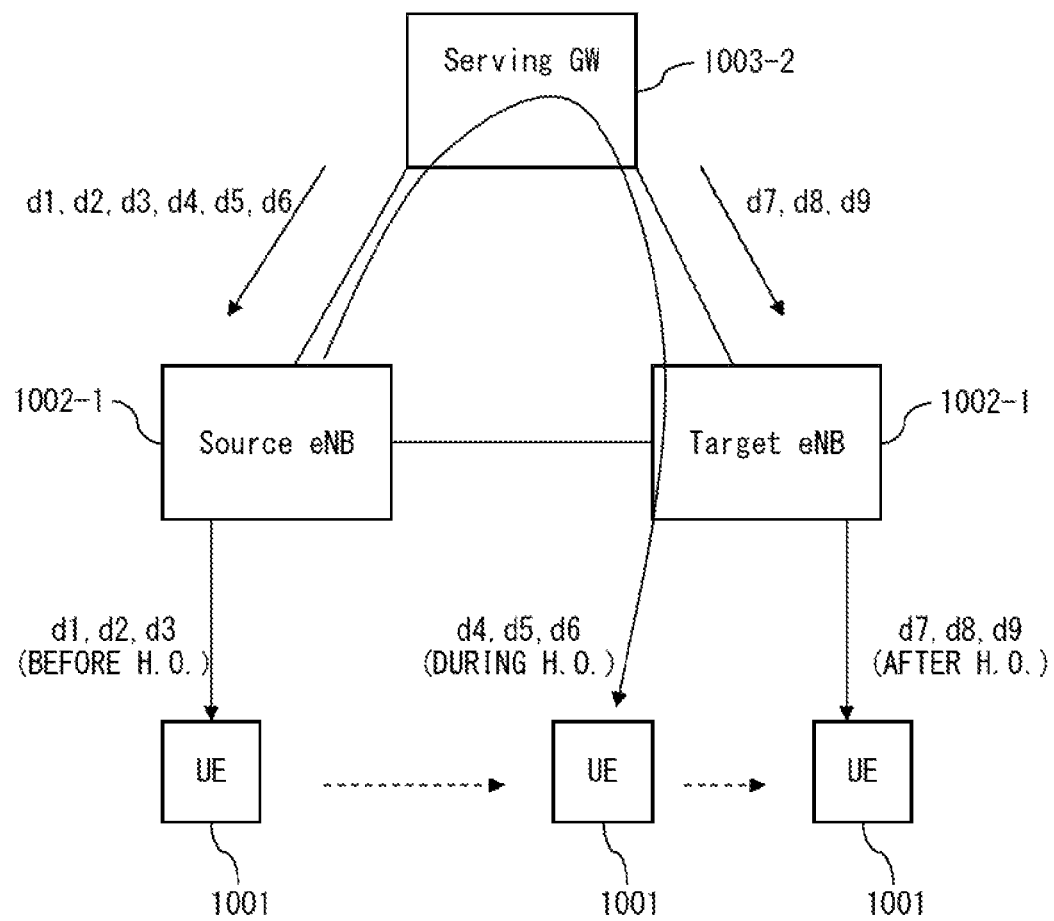
FIG. 27 is an illustration of the data forwarding in the handover using the S1 interface.

The inter-station link establishing unit 205 searches in the linter-station link status table 206 illustrated in FIG. 5, based on the ID of the Target eNB 200 transmitted from the new information management unit 104. That is, the inter-station link establishing unit 205 checks whether the X2 interface for the Target eNB 200 has been established. Then, if the link has not been established, the inter-station link establishing unit 205 establishes the inter-station link between the Source eNB 200 and the Target eNB 200 based on the IP address and the port number transmitted from the new information management unit 104 (FIG. 3, S12). At this time, if ARP (Address Resolution Protocol) for the Target eNB 200 has not been resolved, the resolution protocol of ARP is performed before the communication between the Source eNB and the Target eNB is started. The setup procedure of the X2 interface may be similar to the conventional example, for example, illustrated in FIG. 17.

Note that the process in S12 of FIG. 3 is an example of the inter-station link establishing procedure execution step or an inter-station link establishing procedure execution unit.

The inter-station link establishing unit 205 updates the status of the X2 interface in the entry having the ID corresponding to the Target eNB 200 in the inter-station link status table 206 in FIG. 23 to "established" (FIG. 3, S13).

Thus, according to this embodiment, it becomes possible, when the occurrence frequency of the handover from the Source eNB 200 to the Target eNB 200 increases, to automatically establish the X2 interface between the Source eNB 200 and the Target eNB 200 and to directly perform the handover process between the Source eNB 200 and the Target eNB 200 using the X2 interface.

Next, the cancellation operation of the X2 interface in the embodiment in FIG. 1 is described below.

Figure 4:
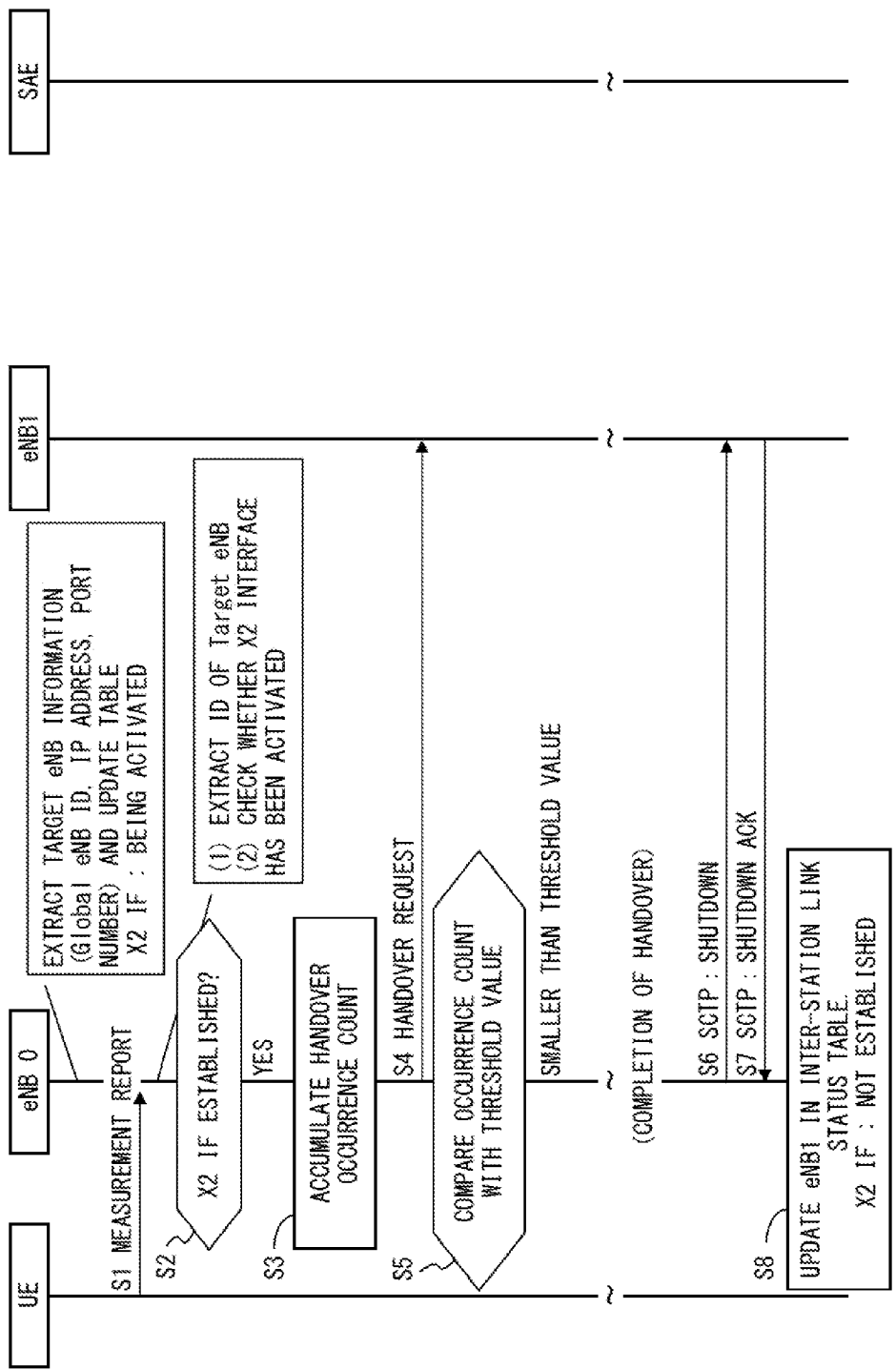
FIG. 4 is a sequence diagram of the cancellation operation of the X2 interface according to the embodiment.

FIG. 4 illustrates a sequence of the cancellation operation of the X2 interface in the embodiment. Hereinafter, the explanation is made in accordance with the sequence diagram.

Upon receiving a signal transmitted from a UE (not specifically illustrated in FIG. 1), the signal transmission/reception unit 201 of the source eNB 200 transmits the received signal to the signal analysis unit 202. The signal analysis unit 202 analyzes the reception signal. When a handover request (RRC: MEASUREMENT REPORT) is detected as a result of the signal analysis, the signal analysis unit 202 sends the handover request (RRC: MEASUREMENT REPORT) to the handover processing unit 203 (FIG. 4, S1).

Based on Target eNB information in the RRC: MEASUREMENT REPORT, the handover processing unit 203 sends, to the inter-link establishing unit 205, an inquiry to check whether the X2 interface with the Target eNB 202 has been established (FIG. 4, S2). The inter-station link establishing unit 205 searches, in the inter-station link status table 206 illustrated in FIG. 5, the ID corresponding to the Target eNB information transmitted from the handover processing unit 203, and checks whether the X2 interface for the ID has been established. The inter-station link establishing unit 205 sends a notification indicating whether the X2 interface has been established to the handover processing unit 203.

Upon receiving a notification that the X2 interface has not been established from the inter-station link establishing unit 205, the handover processing unit 203 transmits a handover request (S1-AP: HANDOVER REQUIRED) to the SAE 100 via the signal transmission/reception unit 201 (FIG. 2, S3). By this, the X2 interface is established between the Source eNB 200 and the Target eNB 200 after the handover process for the Target 2NB 200, based on the operation sequences in FIG. 2 and FIG. 3.

Meanwhile, upon receiving a notification from the inter-station link establishing unit 205 that the X2 interface has been established, the handover processing unit 203 performs the following process.

Figure 8:
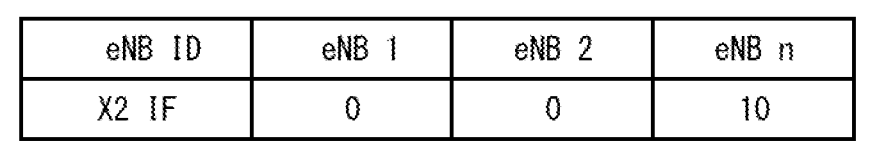

The handover processing unit 203 increments the number of the occurrence of the handover for the Target eNB 200 in the entry corresponding to the Target eNB 200 in the handover occurrence management table 207 (FIG. 4, S3). FIG. 8 illustrates an example of the handover occurrence management table 207 held by the eNB 200. As illustrated in FIG. 8, the handover occurrence management table 207 stores, for every eNB 200 that has a possibility of becoming the target, the ID of the eNB 200, and the number of handover with the X2 interface (X2 IF). That is, the handover occurrence management table 207 manages, for each eNB, the occurrence frequency of the handover using the X2 interface. Now, when a handover to the Target eNB 200 is newly requested, the handover processing unit 203 increments the handover occurrence count HOC by "1" in the entry of the ID corresponding to the Target eNB 200 in the handover occurrence management table 207 illustrated in FIG. 8. Meanwhile, the handover processing unit 203 decrements the handover occurrence count HOC by "1" in the entry after the completion of the handover process (including the failure of the handover).

Figure 12:
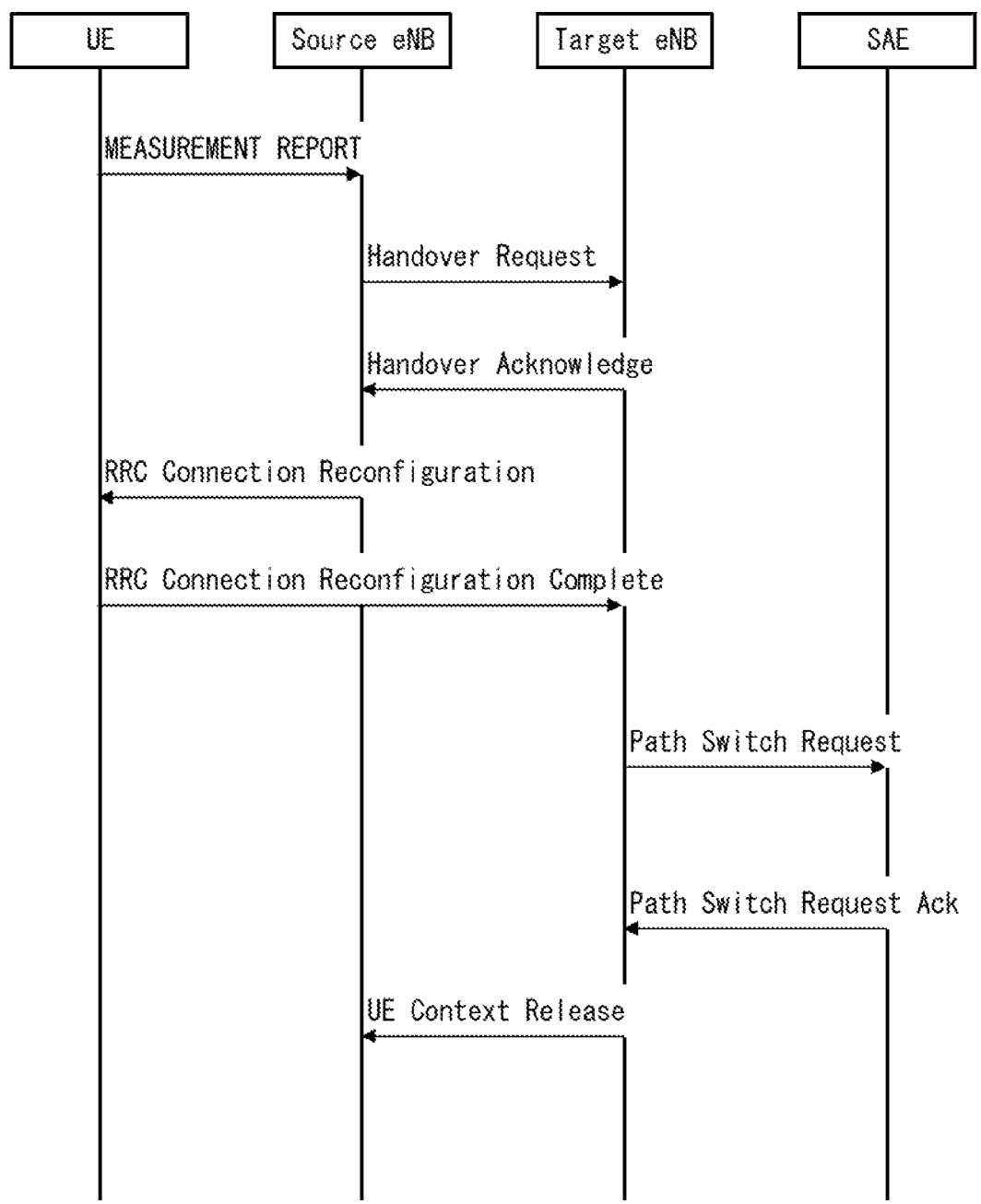
FIG. 12 is an operation sequence diagram of the handover using the X2 interface.
Figure 14:
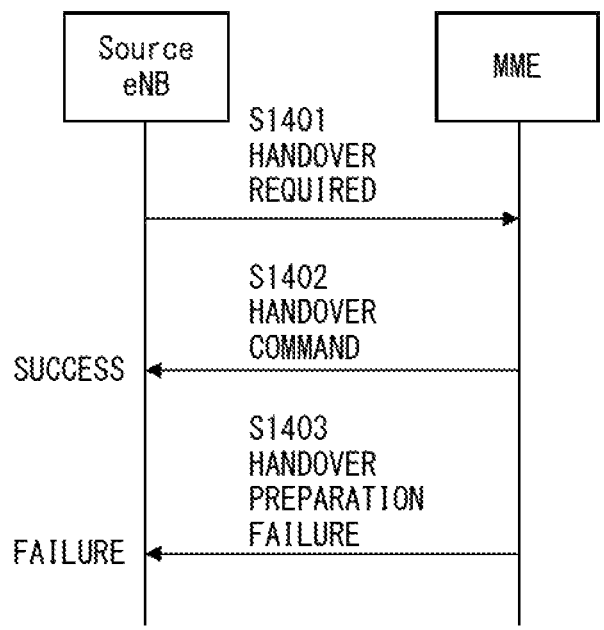
FIG. 14 is an operation sequence diagram of the HANDOVER PREPARATION procedure (S1-AP).
Figure 16:
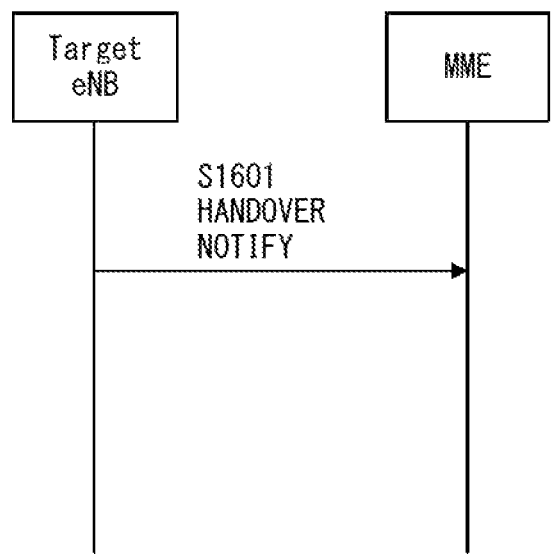
FIG. 16 is an operation sequence diagram of the HANDOVER NOTIFICATION procedure (S1-AP).

Next, the handover processing unit 203 transmits a handover request (HANDOVER REQUEST) through the signal transmission/reception unit 201 to the Target eNB 200, using the X2 interface. Then, the handover processing unit 203 starts the handover procedure using the X2 interface (FIG. 4, S4). This procedure may be realized by, for example, the sequence illustrated in FIG. 12 and the like.

Next, the handover processing unit 203 refers to the handover occurrence management table 207 illustrated in FIG. 8, to obtain the handover occurrence count HOC corresponding to the Target eNB 200, and compares the handover occurrence count HOC with a predetermined threshold value (FIG. 4, S5).

When the handover occurrence count HOC is equal to or larger than the threshold value, the handover processing unit 203 terminates the current process after the handover process for the Target eNB 200 using the X2 interface.

Meanwhile, if the handover occurrence count HOC is smaller than the threshold value, the handover processing unit 203 determines that the number of occurrence of the handover between the Source eNB 200 and the Target eNB 200 has decreased. In this case, the handover processing unit 203 performs the control to cancel the X2 interface between the Source eNB 200 and the Target eNB 200.

The handover processing unit 203 performs, after the handover process for the Target eNB 200, the following process. The handover processing unit 203 transmits a SHUTDOWN message based on the SCTP (Stream Control Transmission Protocol) through the signal transmission/reception unit 201 to the Target eNB 200, using the X2 interface (FIG. 4, S6). As a result, a SHUTDOWN ACK message is returned from the handover processing unit 103 in the Target eNB 200 to the handover processing unit 103 in the Source eNB 200 (FIG. 4, S7), and the X2 interface between the Source eNB 200 and the Target eNB 200 is cancelled.

Note that the processes in S5 through S7 in FIG. 4 described above are examples the inter-station link cancellation step or the inter-station link cancellation unit.

Then the handover processing unit 203 updates the status of the X2 interface of the entry having the ID corresponding to the Target eNB 200 in the inter-station link status table 206 illustrated in FIG. 5 to "not established" (FIG. 4, S8).

Thus, according to the embodiment, it becomes possible, when the occurrence frequency of the handover from the Source eNB 200 to the Target eNB 200 decreases, to automatically cancel the X2 interface between the Source eNB 200 and the Target eNB 200, and to release the resource of the X2 interface.

As described above, according to the embodiment, it becomes possible to establish or cancel an inter-station link between eNBs 200 in accordance with the frequency of the occurrence of the handover between the eNBs 200. Therefore, the resources required for the setting of the inter-station link is utilized effectively, and the increase of the number of adjacent eNBs 1002-1 due to the operation of a Home eNB (home base station) and the like in the future may be handled efficiently.

In addition, as a result of the assignment of the handover process to the direct communication between the eNBs, the frequency of handover on the S1-AP interface may be reduced, making it possible to avoid decreasing available line band and resources and to prevent the degradation of the handover service.

Figure 28:
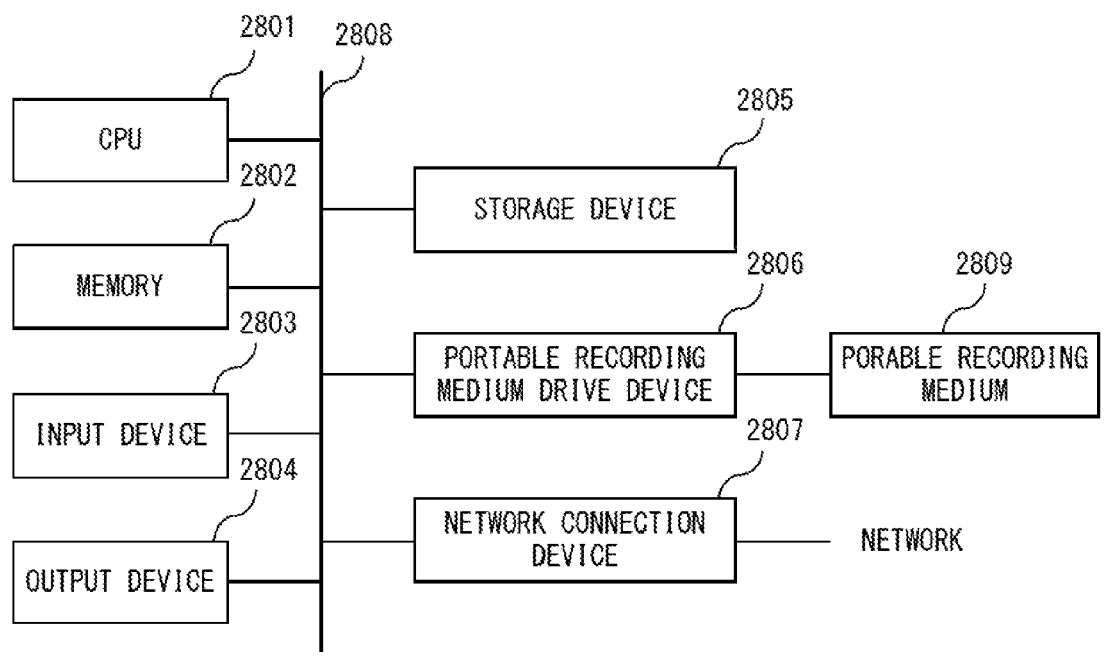
FIG. 28 is a diagram illustrating the hardware configuration of a computer to realize the radio communication system.

FIG. 28 is a diagram illustrating the hardware configuration of a computer to realize the radio communication system in the embodiment in FIG. 1. The hardware realizes the SAE 100 or the eNB 200 in FIG. 1.

The computer illustrated in FIG. 28 has a CPU 2801, a memory 2802, an input device 2803, an output device 2804, a storage device 2805, a portable recording medium drive device 2806 to which a portable recording medium 2809 is inserted, and a network connection device 2807. These units 2801-2807 are connected to each other by means of a bus 2808. The configuration illustrated in FIG. 28 is an example of the computer to realize the system described above, and such a computer is not limited to this configuration.

The CPU 2801 performs the control of the computer as a whole. The memory 2802 includes a memory such as a RAM that temporality stores program or data stored in the storage device 2805 (or in the portable recording medium 2809). The CPU 2801 performs the overall control by executing the program by reading it onto the memory 2802.

The input device 2803 includes, for example, a keyboard, a mouse and the like and interface control devices for them. The input device 2803 detects input operations using the keyboard, mouse and the like by a user and sends a notification of the detection result to the CPU 2801.

The output device 2804 includes a display device, a printing device and the like and interface control devices for them. The output device 2804 outputs data to the display device and the printing device in accordance with the control by the CPU 2801.

The storage device 2805 is, for example, a hard-disc storage device, which is used for saving various data and programs.

The portable recording medium drive device 2806 accommodates and accesses the portable recording medium 2809 such as an optical disc, SDRAM, compact flash and the like.

The network connection device 2807 is a device for connecting the communication line of, for example a LAN (local area network) or a WAN (wide area network).

The SAE 100 or the eNB 200 according to the embodiment in FIG. 1 is realized by the execution of a program having the functions required for the SAE 100 or the eNB 200 by the CPU 2801. The program may be provided by the storage device 2805 or the portable recording medium 2809, or may be obtained from a network by means of the network connection device 2807.

According to the disclosed method or configuration, it becomes possible to automatically establish or cancel an inter-station link between the radio communication nodes in accordance with the occurrence frequency of the handover between the nodes. Therefore, the resources used for the inter-station link is utilized effectively, and the number of radio communication nodes may be increased without lowering the performance of the handover operation.

In addition, since the handover process is assigned to the direct communication between the radio communication nodes, the frequency of handover using the inter-station link with an upper layer apparatus may be reduced, it is possible to increase available line band and resources, and to prevent the degradation of the handover service.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. An interface establishing method in a handover procedure to perform a handover using a first link established between radio node apparatuses or a second link established between a radio node apparatus and a management apparatus that manages a plurality of radio node apparatuses in a radio communication system, the method comprising:

managing a number of occurrences of handover performed by using the second link, each of the plurality of radio node apparatuses being specified as a target radio node apparatus in the handover performed by using the second link;

transmitting an establishment instruction from the management apparatus to a first radio node apparatus accommodated by the management apparatus to establish the first link between the first radio node apparatus and a second radio node apparatus accommodated by the management apparatus when a handover request from the first radio node apparatus to the second radio node apparatus is transmitted from the first radio node apparatus to the management apparatus via the second link and when the number of occurrences of handover performed by using the second link with the second radio node apparatus as the target radio node apparatus is greater than a first threshold;

establishing the first link between the first radio node apparatus and the second radio node apparatus based on the establishment instruction; and canceling the first link between the first radio node apparatus and the second radio node apparatus when a number of occurrences of handover performed by using the first link between the first radio node apparatus and the second radio node apparatus is less than a second threshold in a state where the first link between the first radio node apparatus and the second radio node apparatus is established.

2. The interface establishing method according to claim 1, wherein
the management apparatus issues the establishment instruction when the handover request from the first radio node apparatus to the second radio node apparatus is transmitted from the first radio node apparatus to the management apparatus via the second link and when the number of occurrences of handover performed by using the second link with the second radio node apparatus as the target radio node apparatus is greater than the first threshold in a state where the first link is not established between the first radio node apparatus and the second radio node apparatus.

3. A management apparatus that accommodates a plurality of radio node apparatuses and controls a handover using a first link established between the plurality of radio node apparatuses or a second link established between a radio node apparatus and the management apparatus in a radio communication system, the management apparatus comprising:
a computer configured to issue an establishment instruction to establish the first link between a first radio node apparatus and a second radio node apparatus accommodated by the management apparatus when a handover request from the first radio node apparatus to the second radio node apparatus is transmitted from the first radio node apparatus to the management apparatus via the second link and when a number of occurrences of handover performed by using the second link with the second radio node apparatus as a target radio node apparatus is greater than a first threshold, and to transmit the establishment instruction to the first radio node apparatus,
wherein the first link between the first radio node apparatus and the second radio node apparatus is canceled when a number of occurrences of handover performed by using the first link between the first radio node apparatus and the second radio node apparatus is less than a second threshold in a state where the first link between the first radio node apparatus and the second radio node apparatus is established.

4. The management apparatus according to claim 3, wherein
the computer issues the establishment instruction when the handover request from the first radio node apparatus to the second radio node apparatus is transmitted from the first radio node apparatus to the management apparatus via the second link and when the number of occurrences of handover performed by using the second link with the second radio node apparatus as the target radio node apparatus is greater than the first threshold in a state where the first link is not established between the first radio node apparatus and the second radio node apparatus.

5. A first radio node apparatus that performs a handover with a second radio node apparatus using a first link established between the first radio node apparatus and the second radio node apparatus or a second link established between a radio node apparatus and a management apparatus that accommodates a plurality of radio node apparatuses in a radio communication system, the first radio node apparatus comprising:
a computer configured to establish the first link the first radio node apparatus and the second radio node apparatus based on an establishment instruction issued by the management apparatus when a handover request from the first radio node apparatus to the second radio node apparatus is transmitted from the first radio node apparatus to the management apparatus via the second link and when a number of occurrences of handover performed by using the second link with the second radio node apparatus as a target radio node apparatus is greater than a first threshold, and to cancel the first link between the first radio node apparatus and the second radio node apparatus when a number of occurrences of handover performed by using the first link between the first radio node apparatus and the second radio node apparatus is less than a second threshold in a state where the first link between the first radio node apparatus and the second radio node apparatus is established.

* * * * *